(No Model.)

W. C. DICKEY.
OATMEAL MACHINE.

No. 289,516. Patented Dec. 4, 1883.

Attest
George F. Morrison
Luther Day

Inventor
Wallace C. Dickey
by Bradford Howland
Atty.

UNITED STATES PATENT OFFICE.

WALLACE C. DICKEY, OF PEORIA, ILLINOIS.

OATMEAL-MACHINE.

SPECIFICATION forming part of Letters Patent No. 289,516, dated December 4, 1883.

Application filed September 10, 1883. (No model.)

*To all whom it may concern:*

Be it known that I, WALLACE C. DICKEY, of Peoria, Illinois, have invented a new and useful Improvement in Oatmeal-Machines, of which the following is a specification.

My invention relates to a cylindrical carrier grooved lengthwise and transversely and provided with narrow rings or annular ridges a little more than the length of an oat-kernel apart, between which are vibrating cutters that sever the kernels.

Figure 1:
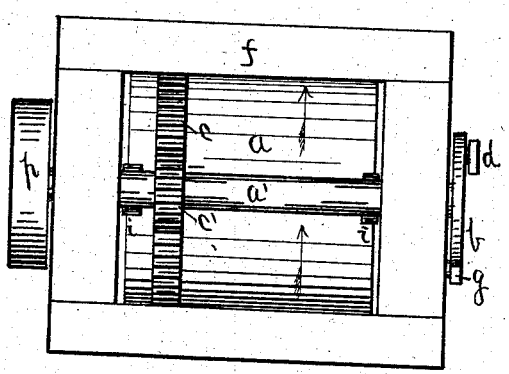
Figure 2:
Figure 3:
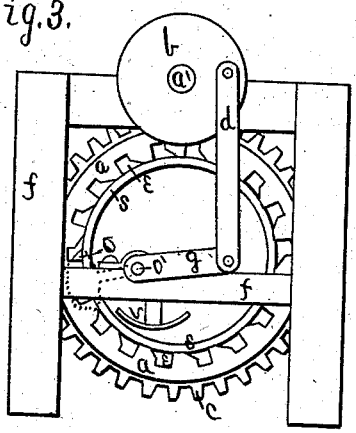
Figure 4:
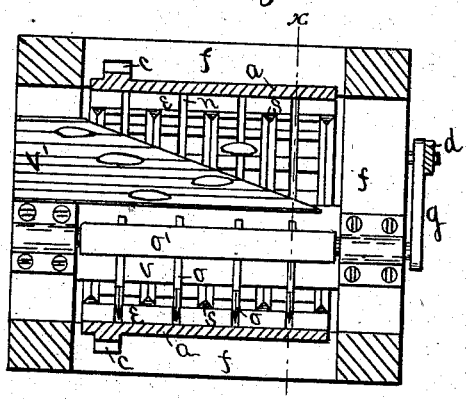

In the drawings forming a part of this specification, Figure 1 is a plan of the machine. Fig. 2 is a vertical cross-section on the dotted line $x\ x$, Fig. 4. Fig. 3 is a rear elevation of the machine. Fig. 4 is a horizontal section on the dotted line $y\ y$, Fig. 2.

Frame $f$ supports the hollow cylinder $a$, which rotates on friction-rollers $i$ at each end of the cylinder. The interior surface of the cylinder is formed with longitudinal grooves $e$, to receive the oat-kernels, with transverse or annular grooves $n$, for cutters $o$ to enter, and with annular ridges or rings $s$ to guide or adjust the kernels between them in grooves $e$, in a position to be severed into approximately equal-sized particles of coarse meal. The annular ridges $s$ are a little farther apart than the length of the kernels to be cut, in order that the kernels may fall between the ridges lengthwise of cylinder $a$ into grooves $e$. Arrows indicate the direction of rotation of cylinder $a$. Cylinder $a$ is also formed with an annular projection, $c$, toothed to connect with toothed wheel $c'$ on shaft $a'$, by means of which the cylinder is rotated when power is applied to pulley $p$ on shaft $a'$. Cutters $o$ are attached to rock-shaft $o'$, which is supported in frame $f$. A vibrating motion is given to cutters $o$ by means of wheel $b$ on shaft $a'$, connecting-rod $d$, and crank $g$ on rock-shaft $o'$. The oats are fed on an inclined corrugated spout or apron, $v'$, from which they fall between ridges $s$ and adjust themselves in grooves $e$. Spout $v'$ is attached to frame $f$. By the rotation of the cylinder the kernels are carried up in contact with the vibrating cutters $o$, which sever them. As the cylinder continues to rotate the particles of meal fall into trough $v$, which is attached at each end to frame $f$. The vibration of cutters $o$ brings different parts of their edges into action, and thus obviates the necessity of frequently sharpening them.

Cylinder $a$ may be modified by forming grooves $e$ and $n$ and annular ridges $s$ on the outside and operated in connection with suitable cutters arranged outside the cylinder. I prefer that one side of grooves $e$ should be made sloping, as shown in the drawings, to facilitate the adjustment of the kernels of grain in them.

I claim as my invention—

1. In an oatmeal-machine, a cylindrical grain-carrier grooved annularly and transversely, and formed with annular ridges, substantially as described.

2. A cylindrical grain-carrier, in combination with cutters, the carrier being grooved annularly and transversely, and having annular ridges, substantially as described.

3. In an oatmeal-machine, a grain-carrier, in combination with vibrating cutters, substantially as described.

4. In a grain-cutting machine, a hollow cylinder, in combination with cutters, the interior of the cylinder being grooved annularly and transversely, substantially as described.

5. Cylinder $a$, formed with grooves $e$ and $n$ and ridges $s$, in combination with cutters $o$, rock-shaft $o'$, and trough $v$, substantially as described.

6. A grain-carrying cylinder grooved annularly and transversely, in combination with the corrugated spout $v'$, substantially as described.

WALLACE C. DICKEY.

Attest:
O. P. STEVENSON,
WM. WRIGHT.